United States Patent [19]
De Wit et al.

[11] Patent Number: 5,929,151
[45] Date of Patent: Jul. 27, 1999

[54] KETONE POLYMER-EPOXY BLEND COMPOSITIONS

[76] Inventors: Gerrijt De Wit, Binnenweg 23, 4641 RX Ossendrecht; Hendricus F. Zirkzee, Narcissenveld 6, 4613 DD Bergen op Zoom, both of Netherlands

[21] Appl. No.: 08/961,103

[22] Filed: Oct. 30, 1997

[51] Int. Cl.$^6$ ...................................................... C08J 5/05
[52] U.S. Cl. .......................... 524/381; 428/524; 524/372; 524/383; 525/93; 528/392
[58] Field of Search ............................... 525/93; 428/524; 524/372, 381, 383; 528/392

[56] References Cited

U.S. PATENT DOCUMENTS

| | | |
|---|---|---|
| 4,761,448 | 8/1988 | Kluttz . |
| 4,950,703 | 8/1990 | Smutny . |
| 4,954,555 | 9/1990 | Smutny . |
| 4,999,399 | 3/1991 | Smutny . |
| 5,028,652 | 7/1991 | Smutny . |
| 5,049,630 | 9/1991 | Smutny . |
| 5,066,701 | 11/1991 | George . |
| 5,071,916 | 12/1991 | Gergen . |
| 5,077,333 | 12/1991 | George . |
| 5,115,002 | 5/1992 | VanHelden . |
| 5,115,003 | 5/1992 | George . |
| 5,122,564 | 6/1992 | George . |
| 5,122,565 | 6/1992 | George . |
| 5,126,496 | 6/1992 | Slaugh . |
| 5,128,402 | 7/1992 | Slaugh . |
| 5,141,979 | 8/1992 | George . |
| 5,141,981 | 8/1992 | George . |
| 5,232,968 | 8/1993 | Davidson ................................ 524/381 |
| 5,286,785 | 2/1994 | Gijsman . |
| 5,371,127 | 12/1994 | Piotrowski et al. ..................... 524/114 |
| 5,405,700 | 4/1995 | Weinhauf et al. ....................... 428/413 |
| 5,508,329 | 4/1996 | Dolden . |

FOREIGN PATENT DOCUMENTS

| | | |
|---|---|---|
| 478088 | 11/1935 | European Pat. Off. . |
| 440293 | 7/1991 | European Pat. Off. . |
| 310166 | 6/1994 | European Pat. Off. . |
| 529696 | 12/1994 | European Pat. Off. . |
| 629663 | 12/1994 | European Pat. Off. . |
| 489517 | 12/1996 | European Pat. Off. . |
| 2249549 | 8/1990 | United Kingdom . |
| 9301239 | 1/1993 | WIPO . |

*Primary Examiner*—Robert Dawson
*Assistant Examiner*—D. Aylward

[57] ABSTRACT

A polyketone composition having improved processability consisting of a polyketone, a thermosettable epoxy resin and a curing agent sufficient to cure the epoxy resin when exposed to processing temperatures such as injection molding to form a finished article. When the composition is exposed to processing temperatures to form a finished article, the article consists of a continuous polyketone phase having dispersed therein cured particles of epoxy resin.

6 Claims, No Drawings

KETONE POLYMER-EPOXY BLEND COMPOSITIONS

FIELD OF THE INVENTION

This invention relates to ketone polymers and more particularly to compositions of ketone polymers having in admixture a ketone polymer and an epoxy resin and a cross-linking agent and/or catalyst for curing the epoxy resin and further to a process for preparing a ketone polymer composition.

BACKGROUND OF THE INVENTION

The class of polymers of carbon monoxide and olefins has been known for some time. U.S. Pat. No. 2,495,286 (Brubaker) disclosed such polymers of relatively low carbon monoxide content in the presence of free radical initiators, e.g., peroxy compounds. Great Britain Patent 1,081,304 discloses similar polymers of higher carbon monoxide content in the presence of alkylphosphine complexes of palladium compounds as catalyst. U.S. Pat. No. 3,694,412 (Nozaki) extended the reactions to produce linear alternating polymers in the presence of arylphosphine complexes of palladium moieties and certain inert solvents.

More recently, the class of linear alternating polymers of carbon monoxide and at least one ethylenically unsaturated hydrocarbon, now known as polyketones or ketone polymers, has become of greater interest. U.S. Pat. No. 4,880,903 (VanBroekhoven, et al.) discloses a linear alternating ketone terpolymer of carbon monoxide, ethylene, and other olefinically unsaturated hydrocarbons, such as propylene. Processes for production of the polyketones typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 VanBroekhoven, et al.) discloses a process for preparing polymers of carbon monoxide and at least one ethylenically unsaturated hydrocarbon using the preferred catalyst comprising a compound of palladium, the anion of a non-hydrohalogenic acid having a pKa of below about 6 and a bidentate ligand of phosphorus. U.S. Pat. No. 4,880,903 and U.S. Pat. No. 4,843,144 are hereby incorporated by reference.

The resulting polymers are relatively high molecular weight materials having established utility as premium thermoplastics in the production of shaped articles, such as containers for food and drink and parts for the automotive industry, which are produced by processing the ketone polymer according to well known methods.

This family of polymers is called polyketones. The polyketone is, generally, semi-crystalline with a melting point in the range of about 170 to about 250° C.; depending on the polyketone olefinic monomer ratio. In the melt, the polyketone exhibits rheological behavior typical for a linear entangled flexible chain. Therefore, these polyketones are suitable for use in a broad range of processes and equipment which have been developed for conventional thermoplastics.

One unusual aspect of the Theological behavior of polyketones is their tendency to exhibit a gradual increase in melt viscosity with increasing residence time in the melt. Many thermoplastics undergo chemical changes in the melt, but most chemical changes are the consequence of chemical scission reactions and involve a gradually decreasing melt viscosity. Aliphatic polyketones, however, undergo (aldol)-condensation which results in an increasing melt viscosity due to cross-linking of the polyketones. This cross-linking reaction during processing is unfavorable since it has significant influence on the melt processing behavior and the final properties of the polyketone. Therefore a lot of effort has been expended upon the melt stabilization of the polyketone.

Many procedures of the melt stabilization of polyketone are based upon the addition of additives such as "E-AA" (U.S. Pat. No. 5049630, U.S. Pat. No. 5071916), hydroxyapatite (BP 478088, U.S. Pat. No. 5066701, U.S. Pat. No. 5077333, U.S. Pat. No. 5115003, U.S. Pat. No. 5122564, U.S. Pat. No. 5122565, U.S. Pat. No. 5141981), aluminates (EP 310166, EP 489517, EP 629663, U.S. Pat. No. 4761448, U.S. Pat. No. 4950703, U.S. Pat. No. 4954555, U.S. Pat. No. 5508329, U.S. Pat. No. 5527851, WO 9301239, U.S. Pat. No. 5141979), zinc-aluminates (EP 440293, U.S. Pat. No. 4999399, U.S. Pat. No. 5028652), aluminumsilicate (GB 2249549, U.S. Pat. No. 5115002), hydrotalcite (U.S. Pat. No. 5286785) and oxides (EP 529696, U.S. Pat. No. 5126496, U.S. Pat. No. 5128402).

U.S. Pat. Nos. 5,288,822 and 5,135,976 and International Application WO 92/14780 all disclose polyketones having in combination an epoxy compound. In WO 92/14780, there is disclosed a combination of an epoxy compound and an amine compound in a stabilizing amount. However, there does not appear to be any prior art that has been uncovered disclosing a polyketone with an epoxy resin in combination with a cross-linking agent and/or a catalyst for curing the epoxy.

SUMMARY OF THE INVENTION

The present invention provides certain ketone polymer compositions which ketone polymers are of an alternating or random type polymers comprising carbon monoxide and at least one ethylenically unsaturated hydrocarbon. The ketone polymer composition comprises a ketone polymer, an epoxy resin, and a curing agent and/or catalyst for curing the epoxy resin. The blend of ketone polymer and epoxy resin can be prepared by blending and heating the ketone polymer and epoxy resin into a homogeneous, melt processable blend, blending the blend with a curing agent and/or catalyst to provide a heat curable composition comprising a ketone polymer, a curable epoxy resin and a curing agent and/or catalyst. The composition can then be cured by exposure to sufficient temperature and time such as extrusion, injection molding, compression molding and extrusion blow molding a polyketone composition without significant cross-linking of the ketone polymer. In curing the composition, the epoxy resin undergoes a phase separation in that in the cured state the formed article comprises a ketone polymer phase having dispersed therein cured epoxy particles. The ketone polymers employed herein may be either linear alternating or linear random type polymers, and are preferably alternating.

As used herein and in the claims, curing agent means a cross-linking agent, a catalyst or polymerization agent or the like for curing the epoxy resin.

DESCRIPTION OF THE INVENTION

The ketone polymers (hereinafter referred to polyketones) of this invention preferably comprise an alternating structure which contain substantially one molecule of carbon monoxide for each molecule of unsaturated hydrocarbon. Suitable ethylene unsaturated hydrocarbons for use as precursors of the ketone polymers have up to 20 carbon atoms inclusive, preferably up to 10 carbon atoms, and are aliphatic such as ethylene and other olefins including propylene, 1-butene, isobutylene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene or m-isopropylstyrene. The preferred ketone polymers are copolymers of carbon monoxide and ethylene or terpolymers of carbon monoxide, ethylene and a second ethylenically unsaturated hydrocarbon of at least 3 carbon atoms, particularly an a-olefin such as propylene.

When preferred ketone terpolymers are employed as the major polymeric component of the blends of this invention, there will be within the terpolymer at least 2 units and preferably about 10 to about 100 units incorporating a moiety of ethylene for each unit incorporating a moiety of the second hydrocarbon. The polymer chain of the preferred ketone polymers is therefore represented by the repeating formula

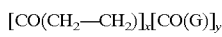

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO (CH$_2$—CH$_2$) units and the —CO (G) units are found randomly throughout the polymer chain, the preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketones of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of the terpolymers, the nature and the proportion of the second hydrocarbon present. Typical melting points for the polymers are from about 175° C. to about 300° C., more typically from about 210° C. to about 260° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketones is illustrated by U.S. Pat. No. 4,843,144 (Van Broekhoven, et al.) which has been incorporated herein by reference. The carbon monoxide and hydrocarbons monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bisl-di(2-methoxyphenyl) phosphinolpropane.

The polymerization to produce the polyketones is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone is typically obtained as a product substantially insoluble in the reaction diluent and the product is recovered by conventional methods such as filtration or decantation. The polyketone is used as recovered or is purified as by contact with a solvent or extraction agent which is selective for catalyst residues. Also U.S. Pat. Nos. 5,527,851; 5,187,258 and 4,925,918 disclosed polyketones and processes for preparing polyketones and are hereby incorporated herein by reference.

The polyketones compositions of the invention comprise an intimate mixture of a polyketone, an epoxy resin and a curing agent for the epoxy resin. The epoxy resin employed in the practice of this invention may be generally any epoxy resin and serves as a plasticizer and subsequent filler for the thermoplastic composition when in the cured state. Particularly such epoxies are glycidyl ethers having at least one epoxide. Preferably, the epoxies suitable for use in this invention, but not limited thereto, are aliphatic, cycloaliphatic or aromatic epoxy resins such as those epoxies disclosed in U.S. Pat. Nos. 3,948,832, 5,135,976, 5,250,228 and 5,288,822, which are incorporated herein by reference, and in which are disclosed numerous epoxy materials that can be employed in the practice of this invention. Epoxy resin as used herein means any of the conventional dimeric, oligomeric or polymeric epoxy materials containing a plurality, i.e. at least 2, of epoxy functional groups. Particular useful are compounds containing at least 2 epoxy groups. Such compounds can be the diglycidylethers of bisphenol A or bisphenol F. Useful are epoxides with epoxy-equivalent molecular weights (EEW) of approximately 60–6000, or more particularly 160–4000 as described in U.S. Pat. No. 4,496,695. Even more preferred are epoxy compounds with EEW values from 160 to 2,500. Particularly useful are epoxies of the diglycidyl-bisphenol-A-type. These are available in different molecular weights, depending on the number of bisphenol-A (BPA) units incorporated in the molecule. An overview can be found in e.g. "Epoxy Resin Manual, Comparative Data, DOW, (1979)" or "The Long and the Short of Epoxy Resins, SHELL, (1992)". The basic type, which was also used in the experiments underlying the present invention consists of essentially one BPA with glycidyl groups on both phenolic ends. These are known under the commercial names Epikote 828 (SHELL), D.E.R. 331 (DOW), Araldite GY250 or U.S. Pat. No. 6010 (Ciba-Geigy). The EEW is about 190 for these epoxies. Other groups of specific interest are epoxy-group modified resins based on cycloaliphatic compounds such as ERL-resins, Union Carbide and cresol-based resins such as ECN-resins, Ciba-Geigy. The epoxy resin employed herein may also be a mixture of epoxies or mixtures with compounds containing only one epoxy group and/or compounds used as "diluents" or additives to further modify flow. See "Epoxy Resin Manual, Comparative Data, DOW, (1979)". The epoxy component may be solid or a liquid crystalline epoxy. Suitable epoxy resins employed herein are prepared from epichlorohydrin and 2,2-bis(4-hydroxyphenyl)propane.

Other epoxy resins may be a glycidyl ether which comprises primary hydroxy group or keto groups such as primary aliphatic or primary benzylic hydroxy groups or ketone carbonyl groups, said epoxy resin comprising per molecule at least one epoxy group and at least one functional group which may be from a primary alcoholic hydroxy group and ketone carbonyl group. The epoxy comprises any number of epoxy group but comprise 1–3 epoxy groups per molecule.

The present copolymer compositions comprise a major amount of an alternating copolymer of carbon monoxide with one or more olefinically unsaturated compounds and an epoxy compound and a curing/polymerization agent.

The curing agent for the epoxy resin can be any curing agent that does not also cross-link the polyketone. Compounds suitable as curing agents are materials selected from anhydrides, polycarboxylic polyesters, isocyanates, phenol-formaldehyde novolacs, polysulfides, polymeric captans, melamine-formaldehyde, urea-formaldehyde, resole phenolics and the like. Useful curing agents can also be found in U.S. Pat. No. 5,250,228 and U.S. Pat. No. 4,623,558 which are incorporated herein by reference. Blends of different curing agents and/or different polymerization catalysts can also be used. The term curing agent means any material as listed above that cures, cross-links or polymerizes the epoxy into a thermoset material.

The amount of curing agent is that amount that sufficiently cross-links the epoxy resin. The amount can range from about 0.1 to about 40 weight %, preferably from about 5.0 to about 25.0 weight The weight % of curing agent is based on the weight of epoxy resin employed. A typical cross-linking agent is hexahydrophthalic anhydride (HHPA).

In the practice of this invention, catalysts may be employed to increase the speed of the reaction. One such catalyst is triphenylethylphosphonium bromide.

The components of this invention comprise in admixture a thermoplastic ketone polymer, a curable or thermosettable epoxy resin and a curing agent for the epoxy resin. The mixture may be prepared by mixing the components under heat and/or pressure. If the components are mixed in an extruder or other melt blending apparatus, the time and temperature must be such that premature curing of epoxy does not occur before processing the composition into a final article. The temperature may be controlled to a setting below that which will cause curing of the epoxy resin.

The composition of this invention comprises a thermoplastic ketone polymer, 5 to about 80 weight % of an epoxy resin, preferably 5 to about 40 weight % and more particularly 20 to about 35 weight %, and 0.1 to about 40 weight % of a curing agent. Preferably the curing agent is present in an amount ranging from 5 to about 25 weight %. The amount of curing agent used herein is dependent on the curing agent employed. The weight % are based on the total weight of the ketone polymer, epoxy resin and curing agent.

The compositions of the invention may also include other additives such an antioxidants, dyes, fillers or reinforcing agents, fire resistant materials, mold release agents, colorants, polymers, impact modifiers, other stabilizers, and other materials designed to improve the processability of the polymers or the properties of the resulting blend. Specific other additives that can be added to the composition include, but are not limited hereto, aluminum trioxide, aluminum hydroxylates, zinc aluminate, hydroxy apatite, zinc aluminate, cupric chromite, mercapto-benzimidozole, aromatic amines (one or two ring amines), aluminum phenoxide, tri-acetyl acetonate, aluminum stearate, zinc-oxide, zinc sulfide, trialkylphosphite, carbon dioxide, zinc salt of an acidic polymer, hydroxy apatite, carbonated hydroxy apatite, mixture of hydroxy apatite and zinc aluminate, mixture of hydroxy apatite and aluminum hydroxide, mixture of magnesium oxide and titanium dioxide, tri-alkoxide compounds with hydroxy apatite, phenolic compounds, decyl alcohol, and 2-ethyl-1-hexanol. Such additives are added prior to, together with, or subsequent to the blending of the polyketone and epoxy resin. The presence of these additives may affect the optimum level of the components of this invention for a given application.

The composition of this invention comprises a blend of a polyketone, an epoxy resin and a curing agent for the epoxy resin. The composition also comprises a melt blended composition wherein the epoxy resin may function as a reactive plasticizer. The addition of an epoxy resin allows processing the composition at lower temperatures than that of pure polyketone, e.g. even below the melting temperature of the polyketone employed which would be about 180° C. to 200° C. compared to the extrusion of a polyketone only which is about 240° C. to about 250° C. for a polyketone with an Tm of about 220° C. Thus it becomes possible to avoid curing of the polyketone, which would normally occur. During molding of the composition into a finished article curing of the epoxy will take place. Phase separation results wherein particles of cured or cross-linked epoxy are dispersed in a continuous polyketone phase. The novel discovery is that the composition can be processed with essentially little or no increase in melt viscosity of the polyketone as demonstrated by the difference in molecular weight of the polymer compared to a polyketone per se. This phase separation comprises essentially two phases, namely a continuous polyketone phase and a non-continuous cured epoxy resin phase wherein cured epoxy resin particles are dispersed in the polyketone phase. The cured epoxy resin when in sufficient amounts acts as a filler in the finished article The composition which is extrusion melt blended can be further processed by methods such as extrusion into sheets, films, plates and shaped parts, injection molding, blow molding, vacuum forming, compression molding and the like. The compositions of the invention are particularly useful for the production of articles useful in both rigid and flexible packaging applications, such as containers and films, and in both internal and external parts for automotive use; fibers, useful yarns, tire cord, and fabric; and coatings for a variety of materials.

DETAILED DESCRIPTION OF THE EXAMPLES OF THIS INVENTION

This invention can be further described by means of the following examples; it being understood, however, that this invention shall in no way be restricted by these examples. In the examples where amounts are in terms of percent, they are percent by weight unless otherwise stated.

EXAMPLE 1

Two different types of polyketone/epoxy blends were prepared. The first blend consisted of polyketone(PK) having a molecular weight as set forth in Table 1 and Epikote 828 epoxy resin, which were added in a 70/30 and 60/40 ratio, respectively, in a small scale extruder. The second blend consisted of a polyketone and ERL-4221 epoxy, also made by small scale extrusion in a 70/30 and 60/40 composition. The extrusion temperature was 180° C. and the screw speed approximately 200 rpm. The molecular weight of the polyketone resin, before extrusion, was determined. Next the influence of extrusion on the polyketone molecular weight in ERL/polyketone and Epicote 828/polyketone formulations were examined using Gel Permeation Chromatograph (GPC). The results are presented in Table 1.

TABLE 1

| Sample | Mw(g/mol) | Compounding temperature (°C.) | Crystal-linity (2) | Epoxy Particle Size (3) | TM°C. (4) |
|---|---|---|---|---|---|
| PK-resin (reference) 100% before extrusion | 87200 | — | normal | -0- | 218 |
| PK-extruded 100% | 103,600 | 230 | minor | -0- | 217 |
| PK-ERL (70/30) (1) | 80,000 | 180 | minor | <0.5 | — |
| PK-ERL (60/40) (1) | 78,900 | 180 | minor | <0.5 | — |
| PK-Epikote 828 (70/30) (1) | 78,300 | 180 | minor | <0.5 | — |
| PK-Epikote 828 (60/40) (1) | 76,700 | 180 | minor | <0.5 | — |

(1) % by weight
(2) Crystallinity as determined by Differential Scanning Colorimeter (DSC) - Tm peak area of PK
(3) Particle size by transmission electron microscope (TEM) at room temperature (microns)
(4) Tm°C. - melting temperature form DSC Note that the molecular weight of the PK-resin without additives showed an increase in molecular weight upon compounding compared to the reference PK-resin. This is due to chemical cross-linking of the PK-chains during compounding at the needed relatively high temperature (230° C.). The PK/epoxy blends, however, show a molecular weight which is similar or even less than the molecular weight of the reference polyketone. This indicates that the cross-linking reaction of polyketone during compounding is strongly inhibited. Transmission electron microscopy photographs showed that these polyketone/epoxy blends were homogeneous. Differential Scanning Colorimeter (DSC) showed hardly any crystallinity of the polyketone indicating a homogenous (partially dissolved) polyketone/epoxy blend as well.

EXAMPLE 2

Polyketone-epoxy blends were cured using Haake Bowl equipment at temperatures of 180–200° C. Hexahydrophthalic anhydride (HHPA) was used as a curing agent. A catalyst, triphenylethylphosphonium bromide (TEPB), was also used to speed up the reaction. The curing process was monitored in an internal mixer, by an increase in the torque, which implies an increase in the viscosity of the blend. After curing, transmission electron microscopy showed a phase separated blend, comprising epoxy particles dispersed in a polyketone matrix.

Additionally the influence of the curing reaction on the polyketone molecular weight in ERl/polyketone/curing agent and Epicote 828/polyketone/curing agent was examined using GPC. The results are presented in Table 2.

TABLE 2

Molecular weight determination of PK by GPC

| Sample | Mw (g/mol) | Compounding temperature (°C.) | Epoxy Particle Size (3) | Crystal-linity (2) | TM° C (4) |
|---|---|---|---|---|---|
| PK-resin (reference) | 87200 | — | 0 | normal | 218 |
| PK resin compounded at 220° C. | 103,600 | — | — | normal | 217 |
| PK-ERL-HHPA-TEPB (70/30) (1) | 91200 | 180 | 1-5 | slightly depressed | 210 |
| PK-ERL-HHPA-TEPB (60/40) (1) | 79400 | 200 | 1-5 | slightly depressed | 210 |
| PK-Epicote 828-HHPA-TEPB (70/30) (1) | 91400 | 180 | 1-5 | slightly depressed | 217 |
| PK-Epicote 828-HHPA-TEPB (60/40)(1) | 94200 | 180 | 1-5 | slightly depressed | 215 |

(1), (2), (3) and (4) are the same as in Table 1.
HHPA: Hexahydrophthalic anhydride
TEPD: Triphenylethylphosphonium bromide Note that the curing of the epoxy phase does not increase the molecular weight of the polyketone phase significantly.

While many modifications and variations of the present invention are possible in view of the foregoing specification, it is understood that they fall within the scope of the appended claims.

What is claimed is:

1. A formed article comprising a continuous thermoplastic ketone polymer phase having dispersed therein particles of cured thermoset epoxy resin said phase comprising an aliphatic ketone polymer composition having improved processability comprising a blend of (1) an aliphatic ketone polymer of carbon monoxide and at least one ethylenically unsaturated hydrocarbon, (2) a thermosettable epoxy resin and (3) a curing agent in an amount sufficient to cure the epoxy resin during the processing of the ketone polymer into the formed article whereby the improved processability results from the epoxy resin plasticizing the ketone polymer during processing into the formed article.

2. The article of claim 1 wherein the ketone polymer has the repeating formula:

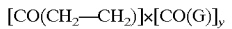

wherein G is a moiety of an ethylenically unsaturated hydrocarbon of at least 3 carbon atoms, polymerized through the ethylenic unsaturation, and the ratio of y:x is no more than about 0.5.

3. The article of claim 1 wherein the polyketone/epoxy resin ratio is from about 0.1/1 to about 10/1 based on the weight of the ketone polymer and epoxy resin.

4. The article of claim 3 wherein the polyketone/epoxy resin is present in ratio of from about 0.5/1 to about 4/1.

5. The article of claim 1 wherein the epoxy resin is a glycidyl ether having at least one epoxide.

6. The article of claim 1 wherein the composition comprises the ketone polymer, 5 to about 80 weight % of the epoxy resin and 0.1 to about 40 weight % of the curing agent, said weight % being based on the total weight of ketone polymer, epoxy resin and curing agent.

* * * * *